United States Patent
Black et al.

(10) Patent No.: US 6,306,508 B1
(45) Date of Patent: Oct. 23, 2001

(54) RESTORATIVE COATING METHOD FOR PLASTIC AND GLASS

(75) Inventors: Robert H. Black, New Rochelle, NY (US); Yehuda C. Cohen, Chicago, IL (US)

(73) Assignee: Great Barrier Systems, Inc., Chicago, IL (US)

( * ) Notice: Subject to any disclaimer, the term of this patent is extended or adjusted under 35 U.S.C. 154(b) by 0 days.

(21) Appl. No.: 09/577,750

(22) Filed: May 23, 2000

Related U.S. Application Data
(60) Provisional application No. 60/135,621, filed on May 24, 1999.

(51) Int. Cl.$^7$ ..................................................... B32B 27/00
(52) U.S. Cl. .................................. 428/425.6; 428/423.1; 428/423.7; 428/480; 427/140
(58) Field of Search ............................. 428/423.1, 425.6, 428/425.5, 423.7, 480; 427/140

(56) References Cited

U.S. PATENT DOCUMENTS

| | | | |
|---|---|---|---|
| 4,301,193 | * 11/1981 | Zuk | 427/140 |
| 4,409,270 | * 10/1983 | Faber et al. | 428/63 |
| 5,387,434 | 2/1995 | Black | 427/154 |
| 5,773,091 | 6/1998 | Perlman et al. | 427/384 |
| 5,972,453 | * 10/1999 | Akiwa et al. | 428/40.1 |

* cited by examiner

*Primary Examiner*—Blaine Copenheaver
*Assistant Examiner*—Christopher Paulraj
(74) *Attorney, Agent, or Firm*—Sidley Austin Brown & Wood; Hugh A. Abrams

(57) ABSTRACT

A product and method of restoring a defaced or scratched window using a polyurethane film applied prior or subsequent to the damage to the window. The polyurethane fills in the scratches to the window and restores optical clarity. The polyurethane may be an aliphatic polyester polyurethane or aliphatic acrylic polyurethane. A further method is described which provides a protective coating to a window including a polyurethane film applied before the window is defaced. The film may be removed and reapplied easily to provide restored optical clarity.

7 Claims, No Drawings

RESTORATIVE COATING METHOD FOR PLASTIC AND GLASS

This application claims the benefit of U.S. Provisional Application Ser. No. 60/135,621, filed May 24, 1999.

BACKGROUND OF THE INVENTION

Graffiti has been an eyesore for centuries. The advent of spray paint and felt tip markers has facilitated the defacing of property. Recently, a new form of defacing property has emerged. Graffiti vandals scratch and embed their names, initials and various insignia into various glass and plastic surfaces. This is accomplished using sandpaper, emery cloth, silicon carbide cloth, paper clips, knives or other hard substances that make penetrating scratches.

Some of the types of surfaces most often defaced are storefront windows, bus windows, train windows, and bus-shelters. Repair of the affected surfaces can be costly. Currently, the only available practical solution is replacing the glass or plastic window material. This is time-consuming and expensive because as soon as the window material is replaced, it is often defaced again.

The type of glass typically used on buses and trains is tempered glass. A panel of tempered glass used on a car of a train, which may measure 2 feet by 3 feet, can be expensive. The polycarbonate plastic of choice used on buses, trains and bus shelters is also expensive.

In the locations where the surface has been scratched, the surface turns white. This is due to the scattering of light. In addition, the depth of the scratches can vary. Replacement of the glass and plastic therefore becomes a necessity. If the window material is not optically clear, whitening caused by scratches can create an unsafe condition; people may not know which direction to exit a bus or a train in an emergency. In addition, people cannot clearly see street signs and other landmarks when they cannot see through the scratched windows of a bus or train.

Removal of scratches in situ is difficult. Sanding plastic and glass material until the base of the scratch is reached and polished is very difficult and time consuming. Often the labor cost exceeds the replacement cost of the glass or plastic.

In order for a surface coating to be distortion-free, it should have the same (or very close to the same) refractive index as the substrate on which it is applied. The refractive index is a measure of the angle that light is bent when it passes through a surface. Tempered glass and polycarbonate have different refractive indexes. The refractive index of glass varies from 1.517–1.890 using sodium vapor as the light source. The refractive index of polycarbonate is 1.586. It is difficult to find a single surface coating that may be applied to both surfaces and remain distortion free because their refractive indices are so different.

Whitening of a plastic or glass surface when scratched or damaged is caused when material is removed and displaced onto the surface of the scratch. Both the scratch and the material on the surface scatter light.

Adhesion of a coating to a substrate can be a significant problem. Glass and polycarbonate are relatively non-porous. It is difficult for a coating to bond well to non-porous surfaces. It is difficult to find a single surface coating that adheres well to both glass and plastic surfaces since the two have different chemical and surface properties.

Finding a suitable surface coating to remove and/or repair these scratches is a challenge. The perfect coating should: fill in the scratches, remove the surface whitening, leave the glass or plastic optically clear, be hard, chemically non-reactive, dimensionally stable, non-yellowing, recoatable and have good surface adhesion.

SUMMARY OF THE INVENTION

An object of the present invention is a composition and method to restore scratched, defaced or damaged glass and plastic window panes, and the like. When used as a restorative, the composition fills in scratches and provides a clear, stable, and distortion-free coating. When used as a preventative coating, it provides a protective barrier which is easily restored to optical clarity.

The coating compositions of the present invention include various types of polyurethane which may be solvent-based moisture-curing polyurethane, two-component solvent-based polyurethane, two-component, water-based polyurethane or single-component, water-based polyurethane. Two-component ambient temperature cure polyurethanes consist of an "A" side and a "B" side. The "A" side usually contains everything except the isocyanate (polyols, catalysts, fillers, stabilizers, etc.) and the "B" side is usually just the isocyanate. The A and B components are mixed together and reaction begins. After mixing, application of the polyurethane to the substrate must be completed before the composition cures. Formation of a film or coating on a scratched window substrate provides improved optical clarity.

The composition and method is useful as a coating to prevent scratches and the adhesion of inks, paints and the like to a window material. Unexpectedly, it was found that it was possible to completely remove the dried coating in a sheet from glass and plastic windows. This is desirable because if the surface is rescratched, one can peel off the coating to restore the surface to its original condition. When applied to undamaged glass or plastic window panes, the coating solidifies and can be removed as a complete sheet when defaced by felt tip markers or spray paint or the like. The removal of the coating sheet removes the graffiti as well. The surface or window may have the coating subsequently reapplied at a lower cost than replacing the window itself.

The coating may also be easily cleaned with an appropriate cleaning material or solvent. When marked with a felt tip marker, for example, the coating resists damage from common cleaning solvents due to its relatively inert nature when cured. Preferable cleaning materials include non-toxic solvents suitable for removing paint and marker ink and other graffiti and more preferably includes 1, methyl propylene glycol ether.

A further object of the invention is to provide a coating composition and method which, when applied to glass and plastic windows unexpectedly gives UV protection to the window material. Also, inside objects and materials which would traditionally fade when exposed to unfiltered sunlight would be protected. The UV protection could be accomplished by spraying the coating composition directly onto the window or by spraying the coating onto a clear film which is then used as a UV shade.

In one embodiment, the invention includes the application of a two-part aliphatic urethane coating to a scratched glass or plastic window.

In a second embodiment, the invention includes the application of a two-part aliphatic acrylic polyurethane coating to a scratched glass or plastic window.

In a third embodiment, the present invention contemplates the application of a plurality of coating layers to a scratched glass or plastic window.

In a fourth embodiment, the present invention includes the application of a polyurethane film or coating to a unmarred window surface as a barrier to graffiti.

In a fifth embodiment, the present invention contemplates the use of a solvent to remove graffiti from a window surface which has been pre-coated with a polyurethane film or coating.

In a sixth embodiment, the present invention contemplates restoration of optical clarity to a window material after graffiti has been applied by removal of a previously applied polyurethane film or coating.

DESCRIPTION OF THE INVENTION

In one embodiment the present invention includes the application to a window surface of a two-component aliphatic polyester polyurethane coating. Aliphatic polyurethanes are polyurethanes based on aliphatic isocyanates (e.g. HDI and IPDI) and mostly polyester and/or acrylic polyols. An example of the coating composition used in the inventive method is manufactured by Insl-X Products Corporation under the name AG-5000. AG-5000 is a two component, activated low VOC aliphatic polyester polyurethane coating including a clear polyester component "A" and an aliphatic urethane prepolymer component "B" activator. The first component comprises:

| Component A | Parts by weight |
|---|---|
| a nonvolatile polyester resin | 42.0–46.0 |
| a Flow Additive | 0.8–1.2 |
| Dibutylin dilaurate (DBTDL-Catalyst) | 0.2–0.3 |
| a UV absorber | 1.0–1.4 |

The second component comprises an aliphatic urethane prepolymer activator:

| Component B | Parts by Weight |
|---|---|
| 1,6-Hexamethylene Diisocyanate (an Aliphatic Polyisocyanate) | 20.0–24.0 |

A coating is prepared from thoroughly mixing the first and second components. In one embodiment, component A and component B are mixed in a 3:1 ratio, respectively. The mixture was applied to previously scratched glass and polycarbonate. The scratches were filled and the white disappeared. A very small amount of scratch was visible. The residual scratch was located where there were very deep scratches and the coating filled most of the area.

Optional additives included in a preferred embodiment of the composition are known in the art of coating compositions in general, and comprise flow additives, UV absorbers and antioxidants discussed in more detail below. The additives are a minor portion of the overall composition comprising 0.8–1.2% of a flow additive and from 1.0–1.2% of a ultraviolet (UV) absorber.

Once prepared, and before hardening or curing, the coating may be applied to a surface by a dip process, or applied with brush, roller or conventional air spray equipment, an airless spray device or an HVLP (high volume low pressure) spray system. Professional spray equipment should be used for best results. In an application with professional spray equipment, the scratches disappeared and were filled in completely. The coating appeared clear and there was little to no distortion. The coating was as visually transparent and distortion free as the original window substrate. There was no optical bending as one would expect when materials with different refractive indices are joined. The coating adhered well to both glass and plastic surfaces.

A second or subsequent coating can be applied on top of an already coated surface. This would be of value if the original coating has become scratched. It was found that the original coating could be scratched and the resulting whitening disappears when a second coat is applied over the first.

The polyurethane surface coating is protected from yellowing by the addition of various ultraviolet absorbers. Some of these, for example, are manufactured by Ciba-Geigy. They are manufactured under the trade name Tinuvin®. The Ciba-Geigy UV absorber Tinuvin® 1130 with a dose rate between 0.25 and 4.0% weight is recommended. In addition to the UV absorber a hindered amine light stabilizer agent is recommended. Also, using a hindered amine light stabilizer (HALS) is preferred. The HALS (Tinuvin® 292) is used in a concentration between 0.25–3.0%. Tinuvin® 292 has been shown to have a synergistic benefit when used in conjunction with UV absorber Tinuvin® products, such as Tinuvin® 130. Often the use of an anti-oxidant (AO) is beneficial. The antioxidant Irganox 1076 is used at a dose rate of 0.25%.

In another embodiment, the two-part urethane coating as described above containing ultraviolet absorbers were coated onto UV-transparent polymethylpentene (TPX) plastic sheets about 5 mils thick when dry. The sheets were first lightly abraded using a steel wool pad to allow adhesion of the coating.

The UV transparent plastic film substrate was weighed on an analytical balance both before and after applying the clear coating. It was confirmed by weighing with an analytical balance that each of the samples had the same thickness of coating material. The coating thickness may also be measured with a micrometer at the point where the spectral beam passes through the UV-transparent film to ensure uniformity of the coating.

A double beam Hitachi UV Scanning spectrophotometer was used for generating the UV spectra. TPX plastic film swatches which were coated with the clear coat/UVA, were placed in the sample beam while swatches which were similarly coated with unmodified clear coat were placed in the reference beam of the instrument. The spectrometer was programmed to scan from 450 nm to 200 nm. Maximum absorption in the 315–325 nm range is important since this is where most UV damage is done to a surface coating. An absorption of over 90% in the described wavelength is recommended for maximum shine retention and anti-yellowing properties of the coating. A preferred coating composition containing UVA/HALS additives achieved better than 90% absorption in the 315–325 nm range.

In addition to two-component aliphatic polyester polyurethane systems as described above, the invention also comprises use of two-component acrylic urethane systems. An example of an aliphatic acrylic polyurethane is manufactured by Yenkin-Majestic Paint Corporation, with a first acrylic component and a second catalyst component identified as product E-2501 and product E-2502, respectively. The two components are mixed together in a 3:1 ratio by volume. After spraying on a substrate, the coating becomes tack free in about an hour. Generally, this class of coatings are believed to possess a longer useful field life and overall chemical resistance than aliphatic urethane coatings and therefore are the preferred coatings of the present invention.

Another example of a two-component acrylic urethane system is manufactured by Transtar Autobody Technologies, Inc.® with a first component identified as Part No. 6841 and a second component identified as Part No. 6844. The components are mixed together in a 4:1 ratio.

| Component A | Parts by weight % |
| --- | --- |
| Methyl Isobutyl Ketone | 27.8 |
| Acetone | 15–25 |
| Acrylic Polymer | 10–15 |
| Hexyl Acetate | 5–10 |
| n-Butyl Acetate | 0–5 |
| Methyl n-Amyl Ketone | 0–5 |
| Dimethylbenzene, Xylene (Mixed isomers) | 0.5 |
| Ethyl Benzene | 0.2 |

| Component B | Parts by Weights % |
| --- | --- |
| Homopolymer of HDI | 25–40 |
| Methyl n-Amyl Ketone | 25–40 |
| Polyisocyanate Adduct based on IPDI | 15–25 |
| n-Butyl Acetate | 0–5 |
| Aromatic Petroleum Distillate | 0–5 |
| 1,2,4-trimethylbenzene | 1.5 |
| Mixed Trimethybenzene | 1.5 |
| Dimehhylbenzene, Xylene (Mixed isomers) | 0.4 |
| Hexamethylene Diisocyanate | 0.2 |
| Ethyl Benzene | 0.1 |

As in the above examples, a coating is prepared by combining part A with part B and sprayed onto a window substrate which has been scratched to act as a restorative agent or before the window is defaced to act as a barrier. The coating is allowed to cure in place and provides a product having a window substrate with an optically transmissive layer provided thereon.

Although a particular preferred embodiment of the invention has been disclosed in detail for illustrative purposes, it will be recognized that variations or modifications of the disclosed composition and methods lie within the scope of the present invention.

What is claimed is:

1. A coated product comprising a window substrate and a coating over said substrate formed by placing a liquid coating over said substrate, said window substrate having scratches formed therein and unscratched portions, said liquid coating filling said scratches to form a substantially equally transmissive medium for light passing through said scratched and said unscratched portions of said window substrate, said liquid coating comprising a two component aliphatic polyester polyurethane, and drying said liquid coating to remove volatile solvents, wherein said liquid coating includes:

a clear polyester component, having active ingredients, consisting essentially of in wt. %
a nonvolatile polyester resin: 42–46,
a flow additive: 0.8–1.2,
a catalyst: 0.2–0.3,
an ultraviolet absorber: 1.0–1.4, and an aliphatic prepolymer activator component, having an active ingredient, consisting essentially of, in wt. %
1.6-hexamethylene diisocyanate: 20–24, and at least one solvent component: 27.1–36.

2. The coated product of claim 1 wherein said clear polyester component and said aliphatic prepolymer activator are mixed together and said liquid coating is applied to said window substrate before curing of said liquid coating.

3. The coated product of claim 1 wherein said nonvolatile polyester resin component further comprises a light stabilizer agent.

4. The coated product of claim 1 wherein said nonvolatile polyester resin component further comprises an antioxidant.

5. The coated product of claim 1 wherein said catalyst is Dibutylin dilaurate.

6. The coated product of claim 1 wherein said coating
clear polyester component consists essentially of, in wt. %
Methyl Isobutyl Ketone 27.8,
Acetone 15–25,
Acrylic Polymer 10–15,
Hexyl Acetate 5–10,
n-Butyl Acetate 0–5,
Methyl n-Amyl Ketone 0–5,
Dimethylbenzene, Xylene (Mixed isomers) 0.5,
Ethyl Benzene 0.2,
and said aliphatic prepolymer activator component consists essentially of, in wt. %
Homopolymer of HDI 25–40,
Methyl n-Amyl Ketone 25–40,
Polyisocyanate Adduct based on IPDI 15–25,
n-Butyl Acetate 0–5,
Aromatic Petroleum Distillate 0–5,
1,2,4-trimethylbenzene 1.5,
Mixed Trimethybenzene 1.5,
Dimehhylbenzene, Xylene (Mixed isomers) 0.4,
Hexamethylene Diisocyanate 0.2,
Ethyl Benzene 0.1.

7. The coated product of claim 6 wherein said liquid coating comprises an aliphatic polyester polyurethane.

* * * * *